US012029696B2

(12) United States Patent
Candela

(10) Patent No.: US 12,029,696 B2
(45) Date of Patent: Jul. 9, 2024

(54) CRADLE LIFT ASSIST HARNESS

(71) Applicant: Gary Joseph Candela, Westminster, MD (US)

(72) Inventor: Gary Joseph Candela, Westminster, MD (US)

(73) Assignee: FirstRes Equipment LLC, Jackson, TN (US)

( * ) Notice: Subject to any disclaimer, the term of this patent is extended or adjusted under 35 U.S.C. 154(b) by 45 days.

(21) Appl. No.: 17/690,486

(22) Filed: Mar. 9, 2022

(65) Prior Publication Data

US 2022/0287899 A1 Sep. 15, 2022

Related U.S. Application Data

(60) Provisional application No. 63/159,680, filed on Mar. 11, 2021.

(51) Int. Cl.
*A61G 7/10* (2006.01)
*A62B 35/00* (2006.01)

(52) U.S. Cl.
CPC ......... *A61G 7/1051* (2013.01); *A61G 7/1038* (2013.01); *A62B 35/0006* (2013.01)

(58) Field of Classification Search
CPC ............ A62B 35/0043; A62B 35/0093; A61G 7/1023; A61G 7/1051; A61G 7/1038
See application file for complete search history.

(56) References Cited

U.S. PATENT DOCUMENTS 3,622,025 A * 11/1971 Petersen ............... B60P 3/1091 414/461
6,331,024 B1 * 12/2001 Gulley ...................... B66C 1/18 294/74
8,061,750 B1 * 11/2011 Hamilton ............... A45C 13/30 294/149

FOREIGN PATENT DOCUMENTS

SE 449176 B * 4/1987 ........... A61G 7/1023

* cited by examiner

*Primary Examiner* — Adam C Ortiz
(74) *Attorney, Agent, or Firm* — Rosenberg, Klein & Lee

(57) ABSTRACT

A cradle lift assist harness for assisting patients who are unable to independently get up from the floor to return to a chair, a bed or ambulation is disclosed. The harness includes a first tension member having a first handle. Further, the harness includes second and third tension members, each being longitudinally extended and having a first end respectively coupled to an end of the first tension member. The second and third tension members each respectively have a second end releasably coupled one to the other to form a cradle support about a patient. A second handle is disposed proximate to the second end of one of the second and third tension members. The cradle that is formed is configured to have a respective intermediate portion thereof be in contiguous contact with portions of a patient's buttocks as tension forces are applied to the first and second handles.

8 Claims, 8 Drawing Sheets

CRADLE LIFT ASSIST HARNESS

REFERENCE TO RELATED APPLICATION

This application is based on Provisional Patent Application Ser. No. 63/159,680, filed 11 Mar. 2021, the entire disclosure of which is hereby incorporated herein by reference in its entirety.

BACKGROUND OF THE INVENTION

Caregivers, such as physicians, nurses, assisted living and nursing home attendants, and first responders, including emergency medical services personnel, police officers and fire and rescue personnel, are often tasked with assessing a situation where they are required to assist a patient, invalid, or frail elderly individual, who is unable to lift themselves off of the floor to return to a chair, or bed, or to ambulation. Rendering such assistance has historically been fraught with risks of injury to both the caregivers and the individual being assisted. To attempt to ameliorate those risks many devices have been introduced into the marketplace, but have been difficult to use with individuals that may be feeble, obese and/or injured. In some cases, such prior assist devices have required direct contact between the caregiver and the individual needing assistance. Where the individual being assisted may be contagious, putting the caregiver at risk, or have an immune deficiency that patents them to great risk of contracting a pathogen, these prior art devices have proven to be detrimental.

SUMMARY OF THE INVENTION

The cradle lift assist harness disclosed herein has been designed to address the aforementioned issues and provide caregivers with an effective and safe solution for easily lifting an individual needing assistance, hereinafter referred to as the patient, to a standing position or to easily suspend the individual in the air to permit a chair, a gurney or cot to be positioned beneath them. The cradle lift assist harness is used with the patent disposed in a sitting position with their knees bent (referred to in the art as a High Fowler's position with knees bent), which positioning of the patent typically requires no contact with the patent or minimal contact with the patent by caregivers. The caregivers are also then able to easily deploy the cradle lift assist harness about the patent and perform the lift with little to no person-to-person contact between the patent and caregivers.

A cradle lift assist harness is disclosed herein. The cradle lift harness includes a first tension member having a first handle. Further, the cradle lift harness includes a second tension member and a third tension member, each being longitudinally extended and each having a first end respectively coupled to an end of the first tension member. The second and third tension members each respectively have a second end releasably coupled one to the other and a second handle being disposed proximate thereto. The second and third tension members are configured to have a respective intermediate portion thereof be in contiguous contact with portions of a patient's buttocks as tension forces are applied to the first and second handles.

From another aspect, a cradle lift assist harness is disclosed that includes a first tension member formed in a loop to define a first handle. The cradle lift assist harness further includes a second tension member and a third tension member each being longitudinally extended and each having a first end respectively coupled to an end of the first tension member, the second and third tension members each respectively having a second end configured for releasable coupling of one to the other, the second tension member having a second handle disposed proximate to the second end thereof, wherein the second and third tension members are configured to have a respective intermediate portion thereof be in contiguous contact with portions of a patient's buttocks as tension forces are applied to the first and second handles.

DETAILED DESCRIPTION OF THE SYSTEM

Figure 1:
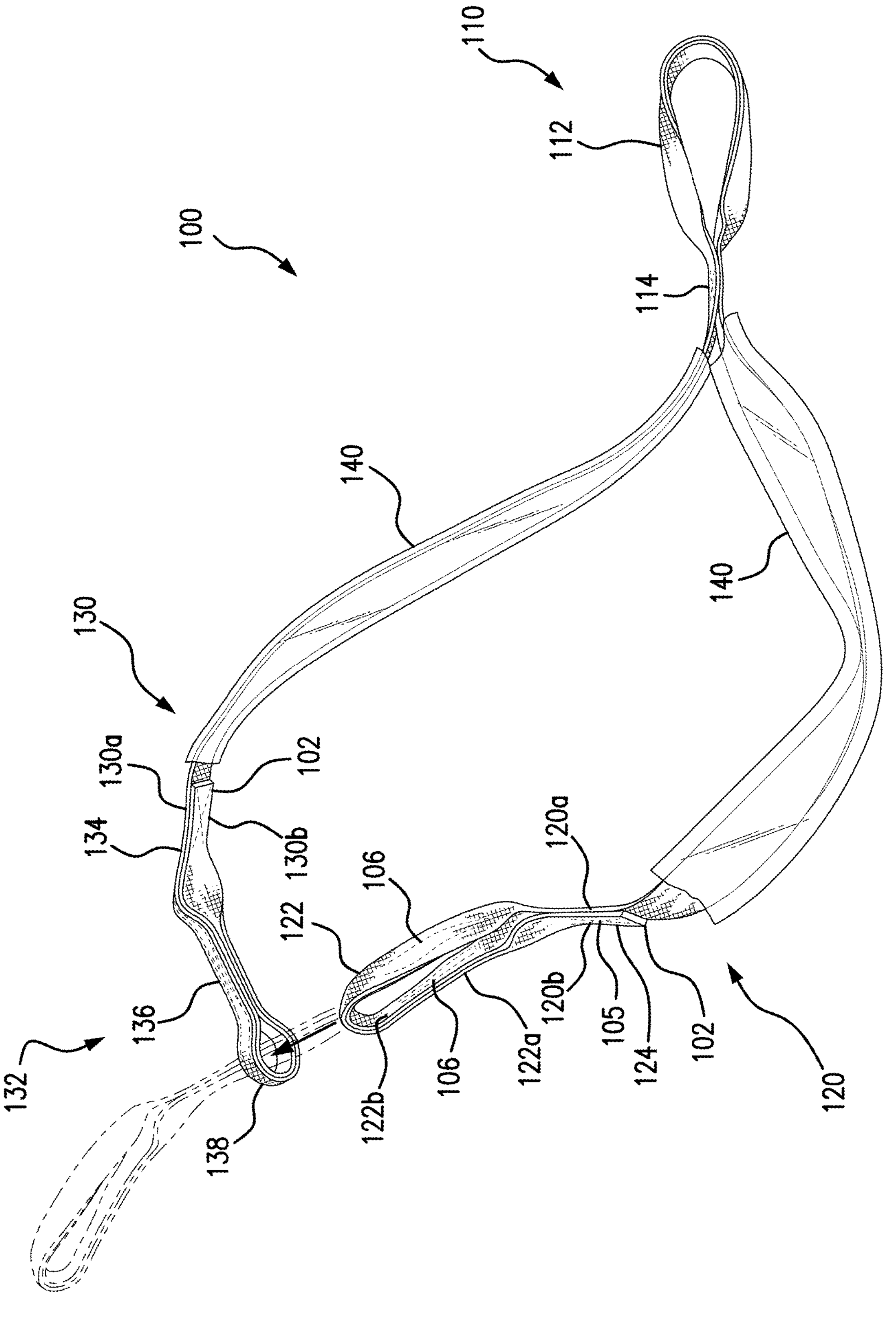
FIG. 1 is a perspective view of one configuration of the cradle lift assist harness of the present invention.
Figure 6:
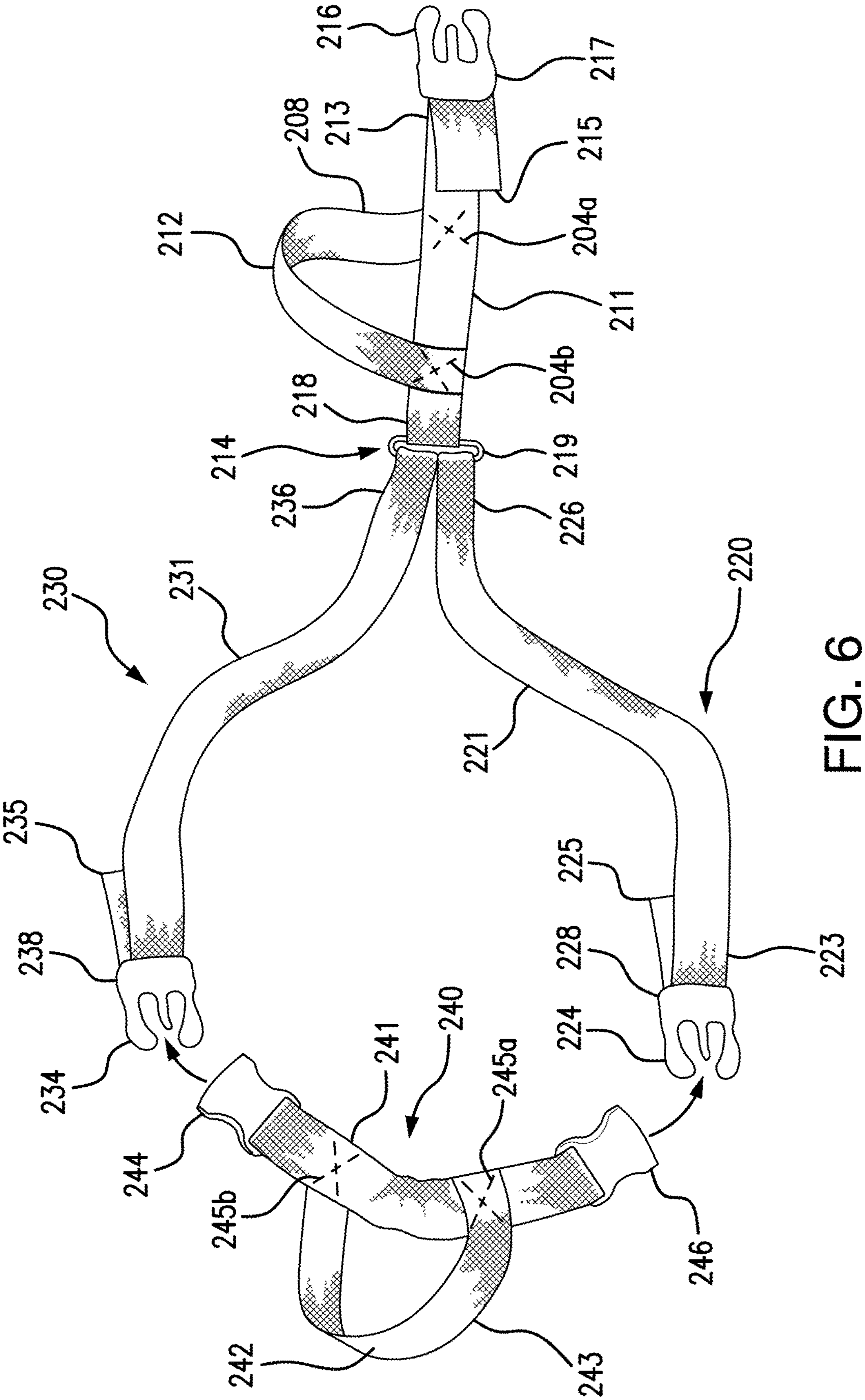
FIG. 6 is a perspective view of another configuration of the cradle lift assist harness of the present invention.

Referring to FIGS. 1 and 6, there are shown configurations of cradle lift assist harness 100, 200 for use in assisting patients who are unable to independently get up from the floor to return to a chair, a bed or ambulation. As used herein, the term "patient" is meant to include any individual needing or requesting mobility assistance, independent of whether or not they temporarily or permanently reside in a medical, quasi-medical or other facility. The term patient is meant to include those who are invalids, frail elderly individuals, and those who may be injured in or in any way incapacitated, and unable to stand unaided. The term "caregiver," as used herein, is meant to include any person who seeks to give assistance in lifting a patient to a standing position or suspending the patient in the air, including, but not limited to, trained rescue or medical services personnel, athletic and rehabilitation trainers, assisted living and nursing home attendants, and those in physical proximity to the patient seeking to provide assistance to that patient.

Cradle lift assist harness 100, as shown in FIGS. 1-5, is bifurcated in that a second tension member 120 and a third tension member 130 extend from a first tension member 110, the first, second and third tension members 110, 120 and 130 being joined together at a juncture 114. The first, second and third tension members 110, 120 and 130 may be formed in one piece formation by a single strip of strap material 102, or formed by joining multiple individual strips of strap material together by such techniques as sewing, ultrasonic welding, adhesive bonding, riveting or fastening with other types of fasteners, including selectively releasable fasteners, closed rings, or a combination thereof. The strip or strips of strap material 102 that form cradle lift assist harness 100 may be formed of woven or unwoven synthetic fiber that may include, but are not limited to, polyester, nylon, polypropylene or combinations thereof. The first, second and third tension members 110, 120 and 130 may also be formed of other materials, including natural or synthetic leather without departing from the inventive concepts disclosed herein. In one working embodiment, cradle lift assist harness 100 is formed by a 2 inch wide, woven polyester web having a minimum breaking strength of 12,000 pounds and a working load of 4,000 pounds. While many different widths of the strap material may be used to form cradle lift assist harness 100, a 2 inch width has been found to adequately support the patient being assisted without creating areas of high loading force on the portions of the patient's body that come in contact with the second and third tension members 120 and 130, and avoids the second and third tension members 120 and 130 "cutting" into the patient's body. Further, when the 2 inch width material is folded to form handles, such results in a width that is easily grasped by caregivers and provides sufficient thickness to the handles to avoid "cutting" into the caregiver's hands.

Referring now to FIGS. 1, 2, 3A and 3B it can be seen that the first tension member 110 is formed with a first handle 112 and connects to the juncture 114. The first tension member 110 is connected to the second tension member 120 and the third tension member 130 at the juncture 114, where the distal end of the first tension member 110 is secured to the proximal end of each of the second tension member 120 and the third tension member 130 by at least one coupling element. In the depicted exemplary embodiment stitching 104 serves as the coupling element. The thread material used for all of the stitching and the particular stitching patterns that are used in constructing cradle lift assist harness 100 are well known in the art of manufacturing slings and harnesses used in the hoisting and towing industries, and therefore there is no need for a detailed described thereof herein. While "stitching" is referred to as a coupling or fastening element, it should be understood that such is not limited to a single continuous stitching pattern, but as is known in the art, may include multiple separate distinct stitching patterns disposed in spaced relationship, overlapping relationship, or a combination thereof.

The proximal end of the first tension member 110 is formed by a loop of the strap material 102 to define a first handle 112. The specific structure of first handle 112 will be described in following paragraphs. In the exemplary embodiment shown, and although not important to the inventive concepts disclosed herein, the same stitching 104 that closes the loop forming the first handle 112, also joins the first tension member 110 to each of the second and third tension members 120 and 130. In another exemplary embodiment shown in FIG. 6, the cradle lift assist harness 200 includes a juncture 214 that serves only as the junction where the first tension member 210, the second tension member 220 and third tension member 230 are joined together by at least one coupling element, which in this exemplary embodiment is a closed ring 219.

While in the exemplary embodiment of FIGS. 1-5 the first handle 112 serves as the first tension member, it should be understood that the first handle 112 may be spaced further from the juncture 114 than shown in the exemplary embodiment. In that arrangement, the first handle 112 and whatever length of strap material extends between the loop closure and the juncture 114, together, define the first tension member 110. In that arrangement of the first tension member 110, the loop that defines first handle 112 will be closed by one or more separate and distinct coupling elements longitudinally spaced from the coupling element of the juncture 114, without departing from the inventive concepts disclosed herein.

The second tension member 120 has a second handle 122 disposed at the distal end thereof. Like first handle 112, the second handle 122, in the exemplary embodiment, is formed by a closed loop, closed by at least one coupling element which may be stitching 105. For both the first handle 112 and the second handle 122, that portion of the strap material that is formed in the loop is evenly folded longitudinally throughout a substantial portion of the loop, the longitudinal fold terminating within 1-3 inches of the loop closure 124. For second handle 122, the two longitudinally extended folded halves of the strap material 122*a* and 122*b*, are formed as a loop that are joined together by stitching 106 to form a stiffened portion of the strap material. The longitudinally folded strap material makes a well-defined handle loop of a width that is easily grasped by caregivers. The longitudinally folded strap material of the loop, being joined together in this exemplary embodiment by sewing, makes a less flaccid portion of the strap material that maintains an open loop contour, even after the harness 100 has been folded for storage. In the exemplary embodiment, the two longitudinally extended halves of the strap material 122*a* and 122*b* are joined together by stitching 106, but other methods of securement may be substituted for stitching 106 without departing from the inventive concepts disclosed herein. It should be understood that while stitching is specifically disclosed as a coupling element herein, other types of coupling elements may be employed, either alone or in combination, including, but not limited to ultrasonic bonding, thermal bonding, adhesive bonding and joined by mechanical fasteners.

The third tension member 130 has a hitch loop portion 132 formed at the distal end thereof. The hitch loop portion 132 includes a hitch loop 138, a grasping portion 136 and a securement portion 134. The hitch loop portion 132 is formed by a distal end portion of the strap material 102 being formed in a loop, with the strap material being evenly folded longitudinally throughout a substantial portion of the loop to form four layers of the strap material at the closure of the open loop. The looped strap material at the most distal end of the third tension member 130 is closed at the securement portion 134, the closed loop forming the hitch loop 138. The opening of the hitch loop 138 is smaller than that of the opening formed in the loops that define the first and second handles 112 and 122. The strap material of both the hitch loop portion 132 and the grasping portion 136 are folded longitudinally in half. The overlaid folded strap material of the grasping portion form four overlaying layers of the strap material that are fastened together.

As will be described in subsequent paragraphs, the second handle 122 will be passed through the hitch loop 138 when the cradle lift assist harness 100 is deployed to assist a patient. The hitch loop 138 is closed by one or more coupling elements, which in the exemplary embodiment is stitching 107. The portion of the strap material that is formed as a loop of the strap material is folded longitudinally throughout the entire hitch loop 138 and the grasping portion 136. The longitudinally folded strap material extends throughout the grasping portion 136 and terminates at the securement portion 134, where each side of the looped strap material transitions to a flat unfolded single layer 130*a*, 130*b* of the strap material 102. The folded longitudinally extended looped strap material 138*a*, 138*b* are joined together to form a stiffened portion of the strap material that makes a well-defined loop. The grasping portion, is formed by four layers of the strap material (two longitudinally folded strips of strap material), is stiffer yet and is of a width that is easily grasped by caregivers. In the exemplary embodiment, the two longitudinally extended halves of the looped strap material of the hitch loop portion 132 are joined together by stitching, but other methods of securement may be substituted for stitching without departing from the inventive concepts disclosed herein.

In order to protect the cradle lift assist harness 100 from contamination by pathogens that might be transmitted thereto by patients or a patient's bodily fluids, disposable plastic sleeves 140 may be installed over the second tension member 120 and third tension member 130. The disposable plastic sleeves 140 may be formed of a medical grade clear or translucent polymer film frequently used in conjunction with medical and dental equipment to prevent transmission of pathogens. The sleeves 140 are provided with a longitudinal extent sufficient to overlay those portions of the second tension member 120 and third tension member 130 that will come in contact with the patient being assisted, while leaving the second handle 122 and the hitch loop 138 exposed. The plastic sleeves 140 are easily installed over the second tension member 120 and third tension member 130 prior to use of the cradle lift assist harness 100 and then subsequently removed and disposed of following that use.

Figure 2:
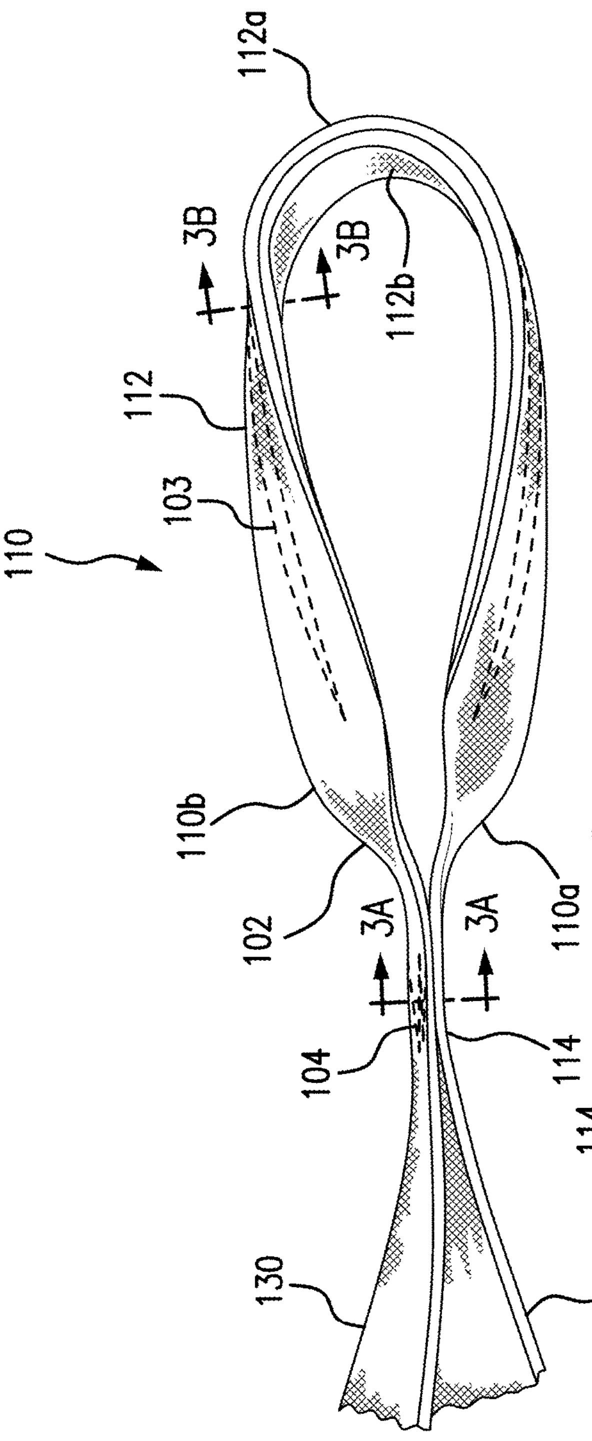
FIG. 2 is an enlarged partial view a first handle of the present invention.
Figure 3A:
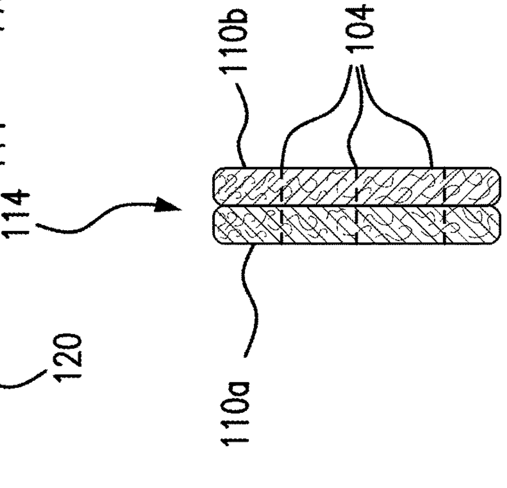
FIG. 3A is a cross-sectional view of a juncture of first and second and third tension members taken along the section line 3A-3A of FIG. 2.
Figure 3B:
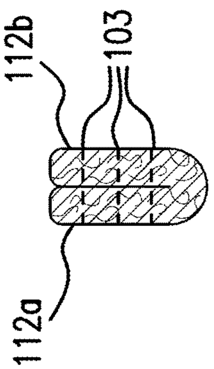
FIG. 3B is a cross-sectional view of the first handle taken along the section line 3B-3B of FIG. 2.

Referring more specifically to FIGS. 2, 3A and 3B, the first handle 112 of the first tension member 110 and the juncture 114 are shown in greater detail. As shown, a portion of the strap material that defines the first tension member 110 is folded longitudinally to form two overlaid layers 112*a* and 112*b* of the strap material 102, and the longitudinally folded portion is arranged in a loop to form the first handle 112. As shown in the cross-sectional view of FIG. 3B, the folded layers 112*a* and 112*b* are secured together by the stitching 103. The loop terminates with the strap material 102 at the terminal ends of the loop being transitioned to flat unfolded portions 110*a* and 110*b* that are disposed in overlaying relationship, each with the other, as shown in FIG. 3A. The loop that forms the first handle 112 is formed by the longitudinally folded strap material 112*a* and 112*b* and is stiffened thereby, making the first handle less flaccid than the single layer strap material portions of the cradle lift assist harness 100, and has a width half that of the unfolded strap material. That combination provides an easy to grasp handle for caregivers.

In this exemplary embodiment, as shown in the cross-sectional view of FIG. 3A, the unfolded portions 110*a* and 110*b* are affixed together at the juncture 114 by the stitching 104, simultaneously securing the proximal ends of the second tension member 120 and the third tension member 130 to the distal end of the first tension member 110, as previously described. Also as previously described, the longitudinal location of the closure of the loop of strap material the forms the first handle 112 may be spaced from the juncture 114 and therefore, the termination of loop of strap material will be secured by one or more coupling elements that are separate and distinct from the one or more coupling elements of the juncture 114.

The structure of the second handle 122 and the loop closure 124, shown in FIG. 1, is like that of the first handle 110. A distal end portion of the strap material 102 that defines the second tension member 120 is folded longitudinally and the longitudinally folded portion is arranged in a loop, with the folded layers 122*a* and 122*b* being secured together by the stitching 106. The loop terminates with the end portions 120*a*, 120*b* of each side of the loop of the strap material having been transitioned to be in a flat unfolded configuration. The overlaying flat unfolded end portions of the loop of strap material 120*a* and 120*b* are disposed in overlaying relationship, each with the other, and joined together to define the loop closure 124. In the embodiment depicted, the flat overlaying layers of strap material 120*a* and 120*b* are joined together by stitching 105. As in the first handle 112 the two halves of the longitudinally folded layers of strap material 122*a* and 122*b* that are arranged into a loop to form the second handle 122 are joined together by stitching 106 and stiffened thereby, making the second handle 122 less flaccid than the single layer strap material portions of the cradle lift assist harness 100, and like the first handle 112, has a width half that of the unfolded strap material. That combination provides another easy to grasp handle for caregivers.

Figure 4:
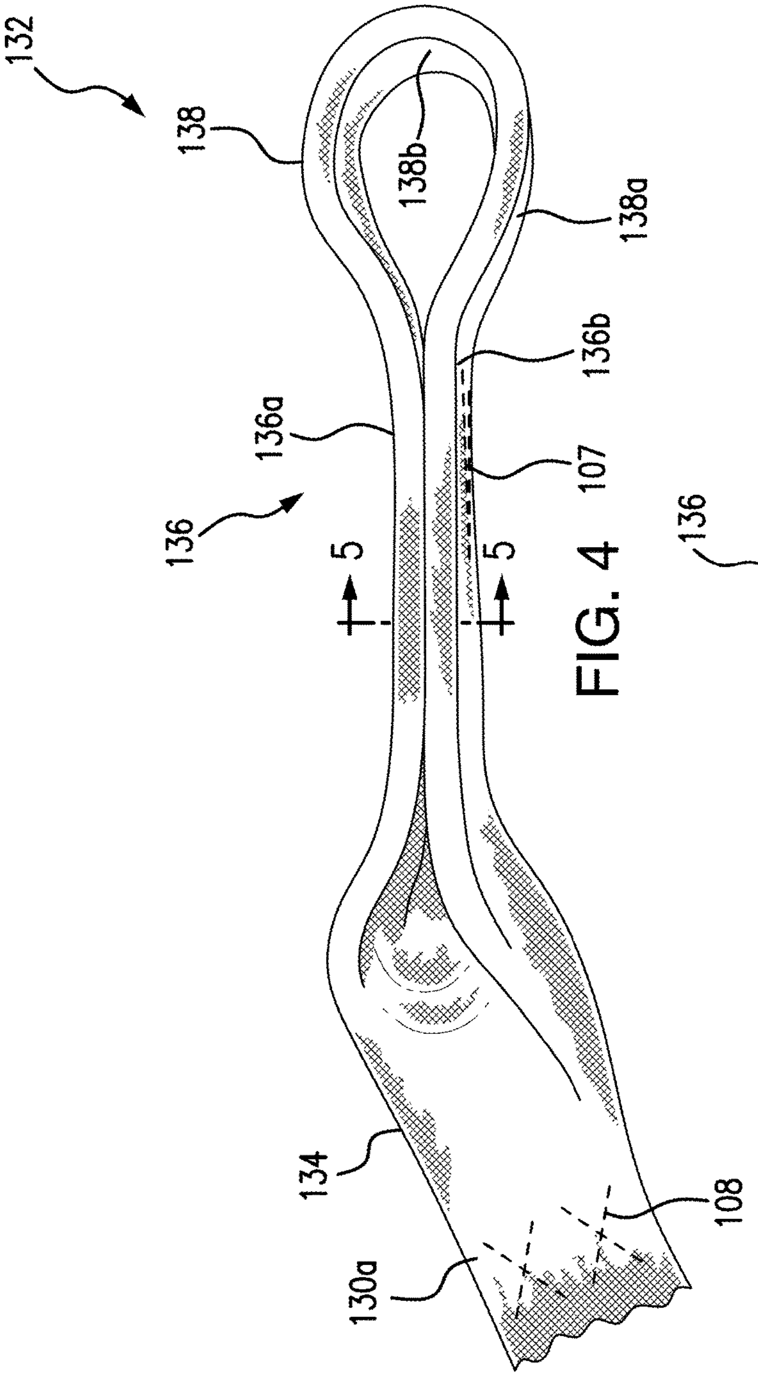
FIG. 4 is an enlarged partial view of the hitch loop of the present invention.
Figure 5:
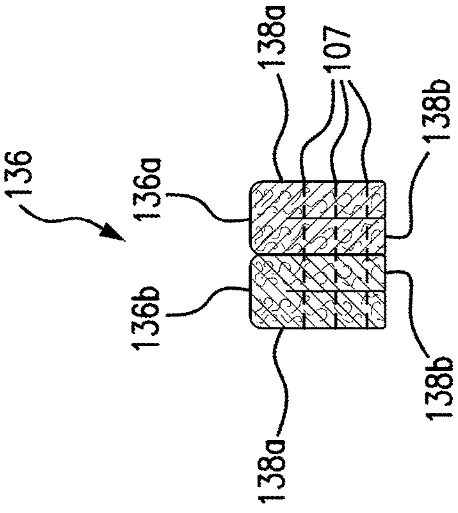
FIG. 5 is a cross-sectional view of the grasping portion of the third tension member taken along the section line 5-5 of FIG. 4.

Referring to FIGS. 4 and 5, there is respectively shown enlarged and cross-sectional views of the hitch loop portion 132 of the third tensioning member 130. Like the second handle 122, the hitch loop 138 and grasping portion 136 are formed by longitudinally folding the distal end portion of the strap material 102 that defines the third tension member 130, and that longitudinally folded portion is arranged in a loop. The longitudinally folded portion forms two overlaid layers 138*a* and 138*b* of the strap material 102, with the folded layers 138*a* and 138*b* being secured together by the stitching 107. The distal most portion of the loop of the longitudinally folded overlaid layers 138*a* and 138*b* of the strap material 102 are maintained as an open loop to define the hitch loop 138, with the remaining portion of the folded layers 138*a* and 138*b* of the two sides of the loop are brought together and form a closure of the hitch loop 138. The closure is longitudinally extended to define the grasping portion 136 where one side 136*a* of the folded layers 136*a* and 136*b* is disposed in overlaying contiguous relationship with the other side 136*b* of the remaining portion of the folded layers 138*a* and 138*b* and the loop sides 136*a* and 136*b* are secured together by the stitching 107 in this exemplary embodiment, as best seen in the cross-sectional view of FIG. 5

The longitudinally folded looped strap material of the grasping portion 136 is terminated with the end portions of each side 136*a*, 136*b* of the loop of strap material being transitioned to be in a flat unfolded configuration. The flat unfolded portions 130*a* and 130*b* are disposed in overlaying relationship, each with the other. The overlaying end portions 130*a* and 130*b* of the loop of strap material are joined together to define the securement portion 134, where they are affixed together by the stitching 108, in the exemplary embodiment. It should be noted that the closure of the hitch loop 138 of the third tensioning member 130 differs from the closure 124 of the second handle 122 in that a portions of each side 136*a*, 136*b* of the loop of strap material that are joined together in overlaying relationship create an arrangement of four layers that are joined together to define the grasping portion 136. Grasping portion 136 is a region of the third tension member 130 that may be held by a caregiver during the deployment of cradle lift assist harness 100, whereby the care giver is able to stabilize the hitch loop portion 132 while the handle 122 is being passed through the hitch loop 138, which procedure will be described in following paragraphs. The four layer structure that defines the grasping portion 136, by virtue of that structure, is very stiff, stiffer than the first and second handles 112 and 122. The grasping portion 136 is located between the hitch loop 138 and the securement portion 134 and defines the closure the hitch loop 138.

Figure 9:
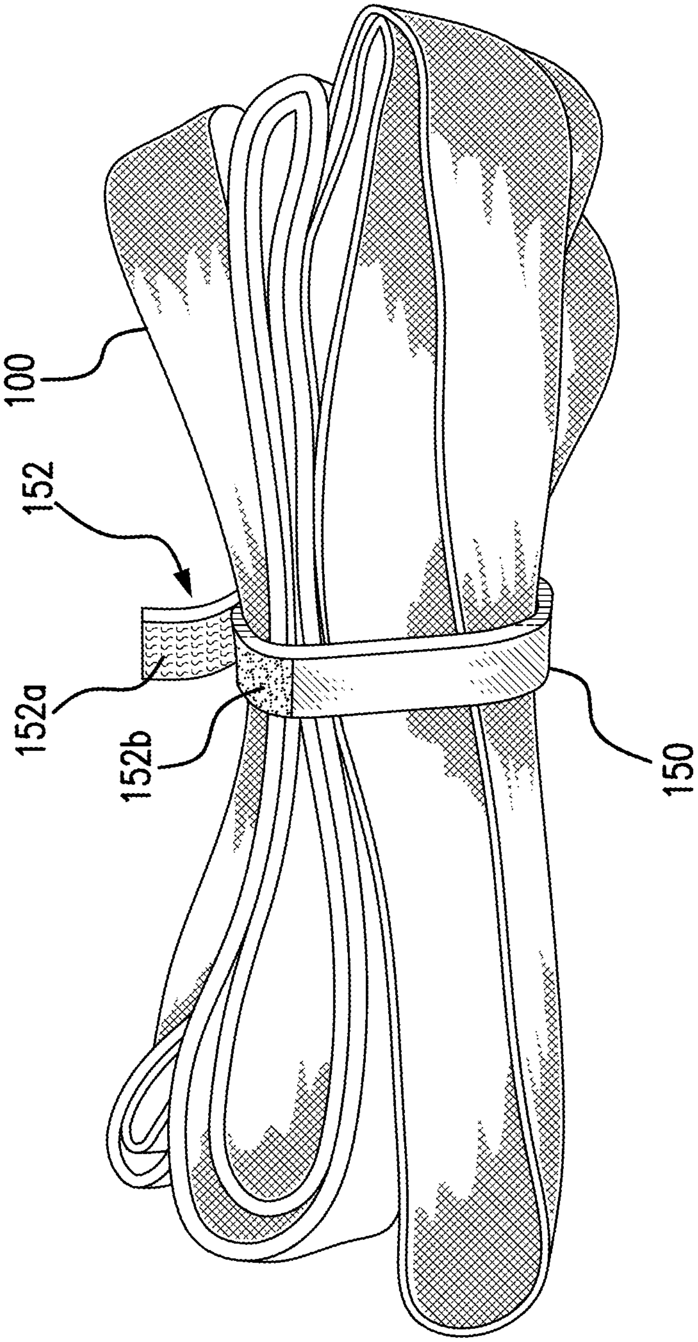
FIG. 9 is a perspective view on the present invention in a folded configuration.

Cradle lift assist harness 100 is easily and compactly stored for subsequent use at a fixed facility, such as a hospital or nursing home; or a mobile facility, such as a cruise ship or passenger train. The compact storage also makes possible storage of cradle lift assist harness 100 in an emergency medical services (EMS) bag carried by first responders, such as emergency medical technicians (EMT), paramedics, and others. Cradle lift assist harness 100 may be rolled, or as shown in FIG. 9, folded compactly and releasably secured by a strap 150 with a hook and loop type fastener 152, providing releasable coupling between a hook portion 152*a* and a loop portion 152*b*. Alternately, the folded cradle lift assist harness 100 may be releasably held in the folded or a rolled storage configuration by an elastic band, a cinching or tie strap, or other type of fastener straps known in the art. Cradle lift assist harness 100 may also be utilized as a shoulder strap of an EMS bag or that of other like bags used for medical and first aid kits, as a means of storing cradle lift assist harness 100. Such bags typically are provided with a pair of D-rings located on one longitudinally extended side thereof, respectively adjacent opposing ends of the bag. By adding a carabiner, or the like, to each of the D-rings, such can releasable engage the first handle 112 at one end of the bag and the other can engage both the second handle 122 and the hitch loop 138 at the opposing end of the bag. Thus, the cradle lift assist harness 100 is thereby stored as a shoulder harness for the bag that usually accompanies first responders and others who are called upon to evaluate and assist a patient that is unable to rise up from the floor.

Figure 7:
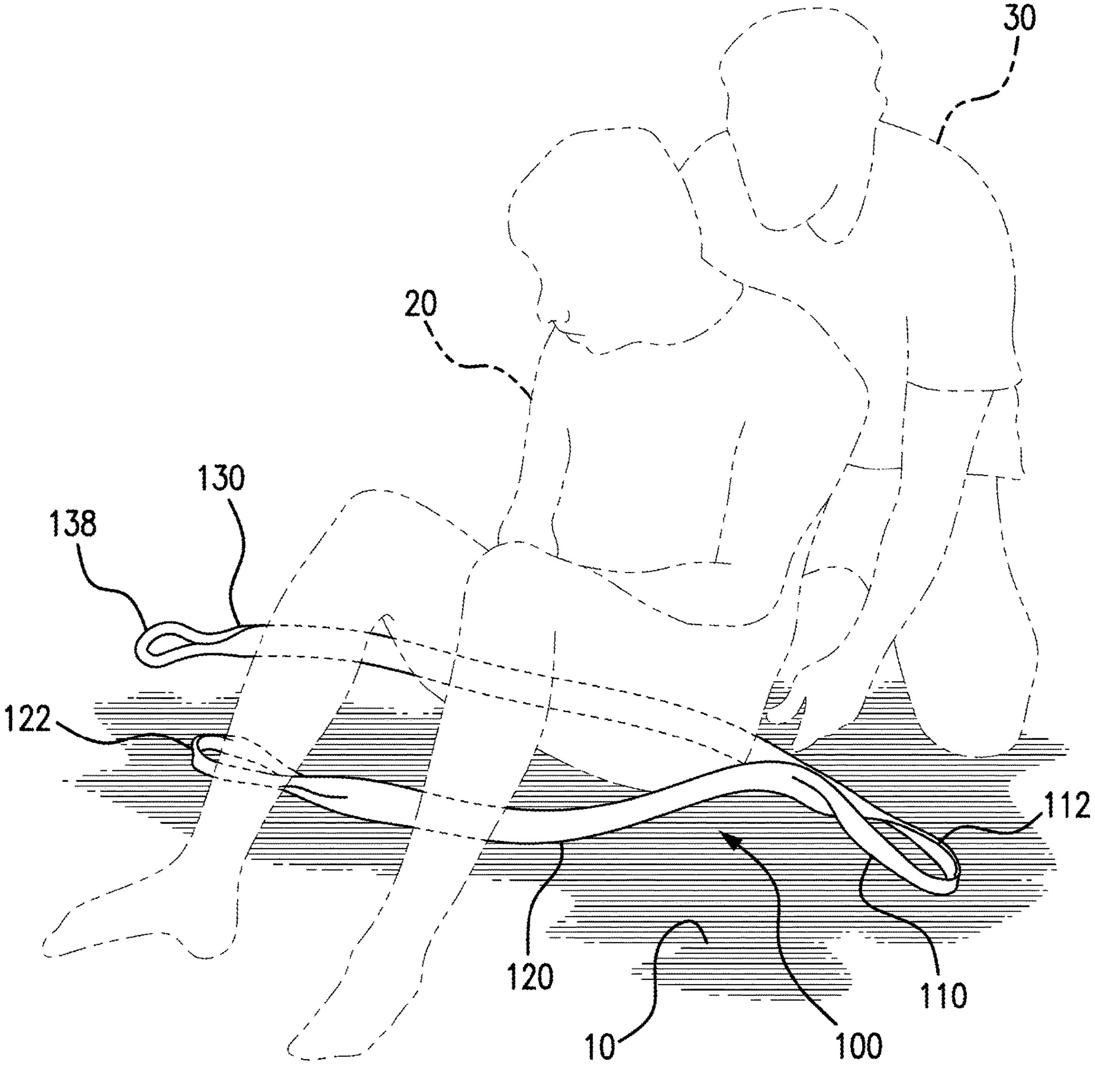
FIG. 7 is an illustration of the present invention being positioned for lifting of an individual needing assistance.

With reference to FIG. 7, cradle lift assist harness 100 will be unfolded or unclipped from an EMS bag, and if desired, each of the second and third tension members 120 and 130 may be sleeved with a respective disposable plastic sleeve 140, as shown in FIG. 1. As will be further described in following paragraphs, the patient 20 is positioned so that they are sitting up with their legs in a knees bent position and their feet substantially flat on the floor 10 (referred to in the art as a High Fowler's position with knees bent). The caregiver 30 then spreads out the cradle lift assist harness 100 with one of the second or third tension members 120, 130 extended behind the torso of the patient 20, and the other of the third or second tension members 130, 120 extended in front of the patient's torso, beneath the patient's legs. To form the harness 100 in a cradle configuration 135 about the patient's buttocks that will enable the caregiver 30 (or two caregivers) to aid the patient 30 to stand or to lift and suspend the patient 30 in the air, with further reference to FIG. 8, the second handle 122 of the second tension member 120 is threaded through the hitch loop 138 of the third tension member 130. The hitch loop 138 is slid along the handle 122 until it stops upon reaching the loop closure 124, where the two overlaying layers 120*a* and 120*b* of flat unfolded strap material of the loop closure 124 add significant resistance to any further sliding of the hitch loop 138 along the second tension member 120. Depending upon the size of the patient 20 being assisted, one caregiver 30, grasping both the first handle 112 and the second handle 122, or two caregivers (not shown), each grasping a respective one of the first handle 112 and the second handle 122 apply a pull (tension) force to the first and second handles 112 and 122. The second and third tension members 120, 130 that are now in the cradle configuration are thereby drawn into contiguous contact with the buttocks portion of the patient's body, as the caregiver(s) 30 then stably pull the patient to either a standing position, or raise and suspend the patient in the air while another caregiver moves a chair, gurney, cot, or the like, beneath the elevated patient.

While the cradle lift assist harness 100 may be provided in a multitude of lengths to accommodate patients of various sizes, working embodiments of cradle lift assist harness 100 have been made with an overall longitudinal extent in the range of 41 inches to 46 inches using strap material 102 having a 2 inch nominal width. Such an overall length has been shown to be of sufficient size to work well with a large majority of patients. Such embodiments have been manufactured with first and second handles 112 and 122 having a maximum inside opening dimension in the approximate range of 7 inches to 9 inches and a hitch loop 138 with a maximum inside opening dimension in the approximate range of 1½ inches to 1¾ inches.

Figure 8:
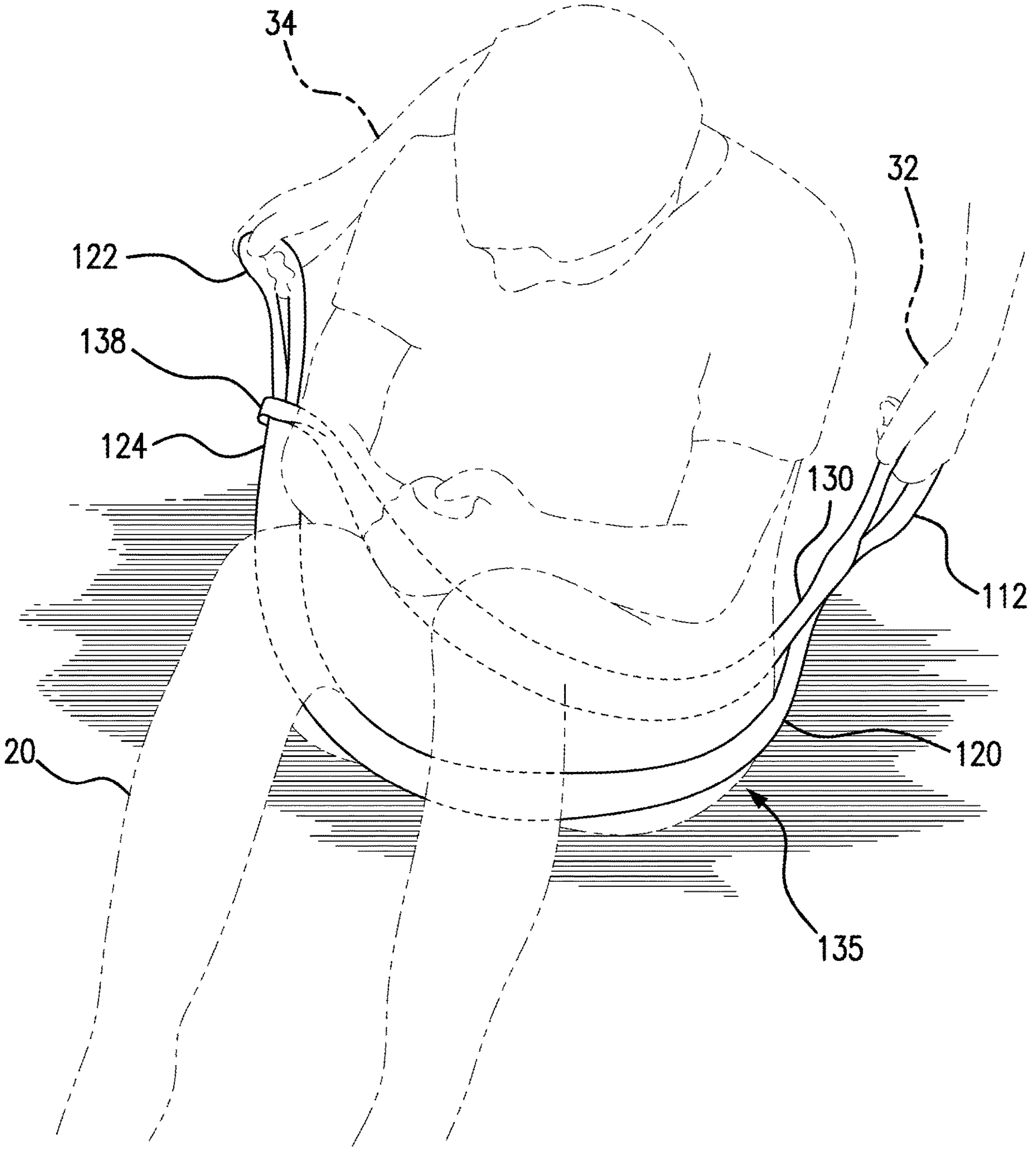
FIG. 8 is an illustration of the present invention being used to lift an individual needing assistance.

As shown in FIGS. 7 and 8, the cradle lift assist harness 100 is positioned with respect to the patient 20 being assisted by separating the bifurcated portion of cradle lift assist harness 100 to extend about the patient. The second and third tension members 120 and 130 are passed about the torso of the patient 20 with the patient 20 sitting up with their legs in knees bent position and their feet substantially flat on the floor 10. In the illustrative example shown, the second tension member 120 is passed under the raided legs of the patient 20 and the third tension member 130 is extended behind the patient. As previously discussed, either the second or third tension members 120, 130 may be disposed beneath the patient's legs with the other of the third or second tension members 130, 120 extended behind the patient 20. Then, the caregiver 30 inserts the second handle 122 formed at the distal end portion of the second tension member 120 through the hitch loop 138 formed at the distal end portion of the third tension member 130. The caregiver 30 slides the hitch loop 138 along the second handle 122 until reaching the flat unfolded loop closure 124 of the second tension member 120, wherein the overlaying flat strap material 120*a* and 120*b* add sufficient resistance against further displacement of the second tension member 120 through the hitch loop 138 to maintain the cradle configuration 135 of the second and third tension members 120, 130 during use of the harness 100 to assist the patient. The cradle lift assist harness 100 is now configured to assist the patient 30 and as illustrated, the caregiver, grasping the first handle 112 with one hand 32, the first handle serving as the first tension member 110, and grasping the second handle 122 of the second tension member 120 with their other hand 34, can then pull the patient 20 to a standing position or lift the patient 20 and to be suspended above the floor. Where a patient is to be suspended above the floor, the size of the patient and/or safety regulations may require two caregivers, each grasping a corresponding one of the first handle 112 and second handle 120, to apply the pull force thereto.

Figure 10:
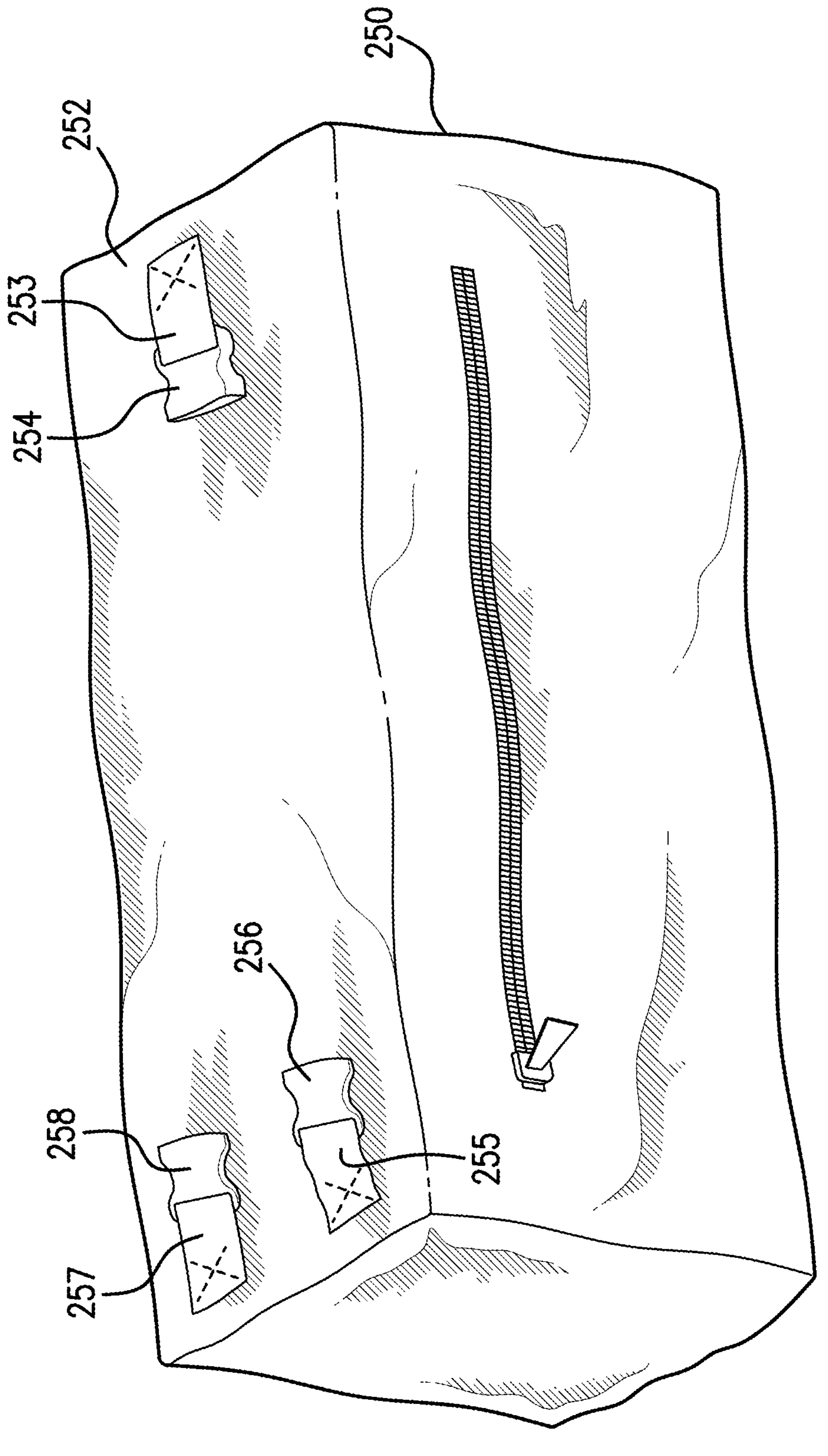
FIG. 10 is a perspective view of a caregiver's emergency bag adapted for use of the configuration of the cradle lift assist harness of FIG. 6 as a shoulder strap.

Referring now to FIGS. 6 and 10, there is shown cradle lift assist harness 200 for use in assisting patients who are unable to lift themselves off of the floor to return to ambulation, a chair, or a bed. Similar to that of cradle lift assist harness 100, cradle lift assist harness 200 is bifurcated in that a second tension member 220 and a third tension member 230 extend from a first tension member 210. Cradle lift assist harness 200 may be formed of the same strap material used to construct cradle lift assist harness 100 described in preceding paragraphs. Cradle lift assist harness 200 is designed to dually serve as a shoulder strap of an EMS bag 250 or other like medical kit, as a means of storing cradle lift assist harness 200 when not being deployed to assist a patient. The bag 250 has three buckle members 254, 256 and 258 arranged thereon. Buckle members 254, 256 and 258 may be of a variety of types made from metal or plastic materials or a combination thereof. Side release buckles made of plastic are well known to be particularly strong, and while not important to the inventive concepts disclosed herein, in one working embodiment the buckle members 254, 256 and 258 are each female buckle components of conventional side release buckles. Each of the buckle members 254, 256 and 258 may be respectively secured to one side 252 of the bag 250 by corresponding connecting straps 253, 255 and 257, which side of the bag 250 may be a top side thereof. Each of the connecting straps 253, 255 and 257 may be formed by a respective short length of strap material, which may be like that of the strap material from which cradle lift assist harnesses 100 and 200 are formed. Connecting straps 253, 255 and 257 are secured to the side 252 of bag 250 and the buckle members 254, 256 and 258 by conventional methods. Alternately, the buckle member 254 through its associated connecting strap 253 may be secured to the top side 252 of the EMS bay 250, while each of the buckle members 256 and 258 through their respective connecting straps 255 and 257 are each secured to different one of the front and back sides of the EMS bag 250 adjacent to the side 252. The coupling member 240 of the harness 200 may be stored within the bag 250.

Cradle lift assist harness 200 includes a first tension member 210 having a buckle member 216 disposed on a proximal end portion 213 of a first strip of strap material 211 of first tension member 210. Buckle member 216, which in the exemplary embodiment shown is a male buckle component, is of a complementary type to that of buckle member 254 for releasable locking engagement therewith. The proximal end 215 of the first strip of strap material 211 of first tension member 210 is threaded through a conventional slide glide portion 217 of buckle member 216 that allows the length of first tension member 210 to be adjusted. The distal end 218 of the first tension member 210 is fixedly secured to the juncture 214, which may be formed by overlaying the first strip of strap material 211 adjacent the distal end 218 of the first tension member 210, the second strip of strap material 221 adjacent the proximal end 226 of the second tension member 220 and the third strip of strap material 231 adjacent the proximal end 236 of the third tension member 230, and affixing them together with fasteners, which may be stitching. Alternatively, as shown in FIG. 6, the juncture 214 may be a closed ring 219 to which the distal end 218 of the first tension member 210, the proximal end 226 of the second tension member 220 and the proximal end 236 of the third tension member 230 are all joined by methods well known in the art of manufacturing slings and harnesses used in the hoisting and towing industries. Further, first tension member 210 includes a first handle 212, formed by length of strap material 208, which may be of the same type of material as that of the first strip of strap material 211, but may be of a narrower width to provide a comfortable handle without longitudinally folding the strap material 208. Although the strap material 208 may be formed in a loop, without longitudinal folding, and the two open ends secured together and simultaneously secured to the strap material 211 of the first tension member 210, this more flaccid configuration of first handle 212 will be more easily graspable by separately joining the opposing ends of the strap material 208 in longitudinally spaced relationship to the strap material 211. Thus, in the exemplary embodiment of FIG. 6, the opposing ends of the first handle 212 are each separately affixed to the first strip of strap material 211 between the juncture 214 and the slide glide portion 217 of buckle member 216, in longitudinally spaced relationship, one end with respect to the other, and secured thereat by respective fastening elements 204*a* and 204*b*. In this exemplary embodiment, the fastening elements 204*a* and 204*b* are stitching.

The second and third tension members 220 and 230 may be identically constructed of respective second and third strips of strap material 221 and 231. Second tension member 220 has a buckle member 224 disposed on the distal end portion 223 of a second strip of strap material 221. Buckle member 224 is of a complementary type to that of buckle members 258 and 256 for releasable locking engagement with a selected one of those buckle members. In the exemplary embodiment shown, the buckle member 224 is a male buckle component. The distal end 225 of the second strip of strap material 221 of second tension member 220 is threaded through a conventional slide glide portion 228 of the buckle member 224, which slide glide portion 228 allows the length of second tension member 220 to be adjusted.

Likewise, third tension member 230 has a buckle member 234 disposed on the distal end portion 233 of a third strip of strap material 231. Buckle member 234 is of a complementary type to that of buckle members 256 and 258 for releasable locking engagement with a selected one of those buckle members. In the exemplary embodiment shown, buckle member 234 is a male buckle component. The distal end 235 of the third strip of strap material 231 of third tension member 230 is threaded through a conventional slide glide portion 238 of buckle member 234, which slide glide portion 228 allows the length of third tension member 230 to be adjusted.

Cradle lift assist harness 200 further includes a coupling member 240 used to join the distal end of second tension member 220 to the distal end of third tension member 230 and thereby create the cradle of the cradle lift assist harness 200 when it is being used to assist a patient. Coupling member 240 is formed by a fourth strip of strap material 241 having a pair of buckle members 244 and 246 coupled to opposing ends thereof by conventional harness coupling methods. Buckle members 244 and 246 are of a complementary type to that of buckle members 234 and 224 for respective releasable locking engagement therewith. In the exemplary embodiment shown, buckle members 244 and 246 are female buckle components. Coupling member 240 additionally includes a second handle 242 formed by length of strap material 243, which may be of the same material as that of the fourth strip of strap material 241, but as in the case of the first handle 212, the strap material 243 may be of a narrower width to provide a comfortable handle without longitudinally folding the strap material 243. Although the strap material 208 may be formed in a loop with the two open ends being secured together and simultaneously secured to the strap material 241 of the coupling member 240, the first handle 212 will be more easily graspable by separately joining the opposing ends of the strap material 243 in longitudinally spaced relationship to the strap material 241. Thus, in the exemplary embodiment of FIG. 6, the opposing ends of the second handle 242 are each separately affixed to the strip of strap material 241, between the two buckle members 244 and 246, in longitudinally spaced relationship, one end with respect to the other, and secured thereat by respective fastening elements 245*a* and 245*b*. In this exemplary embodiment, the fastening elements 204*a* and 204*b* are stitching.

As an alternate or additional means of length adjustment of cradle lift assist harness 200, each of the second and third tension members 220 and 230 may include multiples of the buckle members 224 and 234, respectively, coupled to the corresponding second and third strips of strap material 221 and 231 in longitudinally spaced relationship between the distal and proximal ends thereof. By that arrangement, the coupling member 240 may be joined to the second and third tension members 220 and 230 at selected longitudinal positions defined by the multiple buckle members of each of the second and third tension members 220 and 230.

Where each of the second and third tension members 220 and 230 include a respective single buckle member 224, 234, at the distal end portion 223, 233 thereof, the coupling member 240 is conveniently stored within the EMS bag 250 or additional complementary type buckle member may be secured to one or more exterior sides of EMS bag 250 for releasable coupling therewith as a means of storing the coupling member 240 on the exterior of the EMS bag 250. The arrangement of multiple buckle members on each of the second and third tension members 220 and 230 also provides the opportunity so connect the coupling member 240 between a pair of the multiple buckle members on either one of the second and third tension members 220 and 230 for storage or between the second and third tension members 220 and 230 at intermediate ones of the longitudinally spaced buckle members thereon. Such a storage arrangement may be provided by adding an additional pair of buckle members to one of the second or third tension members 220, 230 of the embodiment shown in FIG. 6, to which the coupling member 240 can be releasable connected while cradle lift assist harness 200 serves as a shoulder strap for the EMS bag 250.

In use, cradle lift assist harness 200 will be disengaged from EMS bag 250 and if desired, each of the second and third tension members 220 and 230 may be sleeved with a respective disposable plastic sleeve 140, like that used in conjunction with cradle lift assist harness 100, previously described. Cradle lift assist harness 200 is then deployed with one of the second or third tension members 220, 230 extended behind the patient's torso with the patient in a sitting position with their knees bent. The other of the third or second tension members 230, 220 is extended in front of the patient's torso, beneath the patient's legs. To form a cradle about the patient's buttocks, the coupling member 240 is connected to the second tension member 220 and the third tension member 230 by joining the buckle members 244 and 246 to a corresponding one of the buckle members 234 and 224 of the third tension member 230 and the second tension member 220. The overall length of the cradle lift assist harness 200 may be adjusted by adjusting one or more of (1) the extent of extension of the proximal end 215 of the first strip of strap material 211 extends from the slide glide portion 217 of buckle member 216, (2) the extent of extension of the distal end 225 of the second strip of strap material 221 extends from the slide glide portion 228 of buckle member 224, and (3) the extent of extension of the distal end 235 of the third strip of strap material 231 extends from the slide glide portion 238 of buckle member 234.

Depending upon the size of the patient being assisted, one caregiver, grasping both the first handle 212 and the second handle 242, or two caregivers, each grasping a respective one of the first handle 212 and the second handle 242 apply a pull (tension) force to the first and second handles 212 and 242. The second and third tension members 220, 230 are thereby drawn into contiguous contact with the buttocks portion of the patient's body, as the caregiver(s) then pull the patient to a standing position or raise and suspend the patient in the air while some other caregiver moves a chair, gurney, cot or the like, beneath the elevated patient.

The descriptions above are intended to illustrate possible implementations of the present invention and are not restrictive. While this invention has been described in connection with specific forms and embodiments thereof, it will be appreciated that various modifications other than those discussed above may be resorted to without departing from the spirit or scope of the invention. Such variations, modifications, and alternatives will become apparent to the skilled artisan upon review of the disclosure. For example, functionally equivalent elements may be substituted for those specifically shown and described and certain features may be used independently of other features, and in certain cases, particular locations of elements may be reversed or interposed, all without departing from the spirit or scope of the invention as defined in the appended Claims. The scope of the invention should therefore be determined with reference to the description above, the appended claims and drawings, along with their full range of equivalents.

What is being claimed is:

1. A cradle lift assist harness comprising:

a first tension member having a first handle; and a second tension member and a third tension member each being longitudinally extended and each having a first end respectively coupled to an end of said first tension member, said second and third tension members each respectively having a second end releasably coupled one to the other and a second handle being disposed adjacent said second end of said second tension member, said second end of said third tension member is formed in a loop, a portion of said looped second end being folded longitudinally and affixed together, an unfolded end portion of said second end being joined to an intermediate portion of said third tension member to define a securement portion, a distal end portion of said longitudinally folded loop forming a hitch loop and opposing sides of a remaining portion of said longitudinally folded loop disposed between said hitch loop and said securement portion being affixed together to form a stiffened portion of said third tension member, and wherein said second and third tension members are configured to have a respective intermediate portion thereof be in contiguous contact with portions of a patient's buttocks as tension forces are applied to said first and second handles.

2. The cradle lift assist harness as recited in claim 1, where said first, second and third tension members are joined at a juncture, said first ends of said second and third tension members being disposed in overlaying relationship at said juncture and affixed one to the other and to said first tension member by a at least one fastening element.

3. The cradle lift assist harness as recited in claim 1, where said first, second and third tension members are together integrally formed in one piece formation.

4. The cradle lift assist harness as recited in claim 1, where said second end of said second tension member is formed in a loop with said second end being affixed to an intermediate portion of said second tension member to define said second handle.

5. The cradle lift assist harness as recited in claim 1, where said second end of said second tension member is formed in a loop, a portion of said looped second end being folded longitudinally and affixed together, an unfolded end portion of said second end being joined to an intermediate portion of said second tension member to form said second handle.

6. The cradle lift assist harness as recited in claim 1, where said third tension member has a hitch loop portion formed at said second end thereof, said second end of said second tension member being releasably coupled to said hitch loop portion.

7. The cradle lift assist harness as recited in claim 6, where said hitch loop portion of said third tension member includes a hitch loop at a distal end thereof and a grasping portion adjacent to said hitch loop.

8. The cradle lift assist harness as recited in claim 1, where said second end of said third tension member includes a hitch loop formed adjacent said second end thereof, said second handle being passed through said hitch loop to releasably couple said second ends of said second and third tension members together.

* * * * *